(12) United States Patent
Yamaguchi et al.

(10) Patent No.: US 7,483,110 B2
(45) Date of Patent: Jan. 27, 2009

(54) LIQUID CRYSTAL DISPLAY DEVICE

(75) Inventors: Hidehiko Yamaguchi, Tsu (JP); Naoshi Yamada, Tsu (JP); Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 231 days.

(21) Appl. No.: 11/074,386

(22) Filed: Mar. 7, 2005

(65) Prior Publication Data

US 2005/0213017 A1 Sep. 29, 2005

(30) Foreign Application Priority Data

Mar. 25, 2004 (JP) ............................. 2004-090204

(51) Int. Cl.
*G02F 1/1339* (2006.01)
(52) U.S. Cl. .................... 349/153; 349/155; 349/156
(58) Field of Classification Search ................ 349/153
See application file for complete search history.

(56) References Cited

U.S. PATENT DOCUMENTS

| | | | | |
|---|---|---|---|---|
| 5,488,498 | A * | 1/1996 | Fujii et al. .................. 349/149 |
| 5,982,471 | A * | 11/1999 | Hirakata et al. ............. 349/155 |
| 6,271,903 | B1 | 8/2001 | Shin et al. |
| 6,392,735 | B1 * | 5/2002 | Tani ........................... 349/156 |
| 6,404,477 | B1 | 6/2002 | Fujiwara et al. |
| 6,587,170 | B2 | 7/2003 | Shin et al. |
| 6,906,771 | B2 | 6/2005 | Takahashi et al. |
| 7,050,137 | B2 | 5/2006 | Hoshino et al. |
| 2003/0063249 | A1 | 4/2003 | Hoshino et al. |
| 2003/0137629 | A1 | 7/2003 | Ichioka et al. |
| 2006/0125993 | A1 | 6/2006 | Hoshino et al. |

FOREIGN PATENT DOCUMENTS

| | | |
|---|---|---|
| JP | 04-295824 | 10/1992 |
| JP | 06-289408 A | 10/1994 |
| JP | 08-201830 A | 8/1996 |
| JP | 09-005780 | 1/1997 |
| JP | 09-152620 A | 6/1997 |
| JP | 09-166789 A | 6/1997 |
| JP | 10-206867 A | 8/1998 |
| JP | 11-202362 A | 7/1999 |
| JP | 2001-013516 A | 1/2001 |

(Continued)

OTHER PUBLICATIONS

Official communication issued in the counterpart Japanese Application No. 2004-090204, mailed on May 22, 2007.

(Continued)

*Primary Examiner*—David Nelms
*Assistant Examiner*—David Y Chung
(74) *Attorney, Agent, or Firm*—Keating & Bennett, LLP (57) ABSTRACT

A liquid crystal display device is one in which unevenness of display, spots, etc. caused by lowering of voltage retention by impurity ions are sufficiently eliminated and reliability of long time/long term use is improved. A liquid crystal display device is formed with a liquid crystal layer between a first substrate and a second substrate configured via a seal, wherein the liquid crystal display device includes electrodes on the liquid crystal layer side of a non-display region of the first substrate and/or the second substrate, and the potentials of the electrodes are substantially the same.

8 Claims, 6 Drawing Sheets

FOREIGN PATENT DOCUMENTS

| | | |
|---|---|---|
| JP | 2002-258264 A | 9/2002 |
| JP | 2003-015137 A | 1/2003 |
| JP | 2003-035909 A | 2/2003 |
| JP | 2003-172946 A | 6/2003 |
| JP | 2003-195339 A | 7/2003 |
| JP | 2003-202584 A | 7/2003 |
| JP | 2003-216062 A | 7/2003 |
| JP | 2003-287768 A | 10/2003 |

OTHER PUBLICATIONS

Official communication issued in the counterpart Japanese Application No. 2004-090204, mailed on Feb. 27, 2007.

* cited by examiner

LIQUID CRYSTAL DISPLAY DEVICE

This Non-provisional application claims priority under 35 U.S.C. § 119(a) of Japanese Patent Application No. 2004-90204 filed in Japan on Mar. 25, 2004, the entire contents of which are hereby incorporated by reference.

BACKGROUND OF THE INVENTION

1. Field of the Invention

The present invention relates to a liquid crystal display device. More specifically, the present invention relates to an active matrix liquid crystal display device in which each pixel electrode arranged in a matrix form is selectively driven with active elements.

2. Description of the Related Art

A liquid crystal display device is necessary as a means for displaying information or pictures, and recently, active matrix liquid crystal display devices have been widely used in applications such as a TV and a monitor. In such applications, a liquid crystal display device is illuminated for a long time and further used over a long period of time, leading to a desire for further improvement in reliability for long term use.

In an active matrix liquid crystal display device, the device is greatly influenced by voltage retention, and thus studies have been made for sufficient elimination of partial unevenness of luminance, spots, etc. caused by lowering of voltage retention by impurity ions within the panel.

Conventionally, in order to prevent display defects from being caused by elution of impurity ions to a display region in a liquid crystal display device, dummy electrodes or dummy pixels are arranged in a non-display region and a voltage is applied to the dummy pixels to retain impurity ions of the non-display region section within the non-display region and to improve reliability (refer to e.g., Japanese Kokai Publication Hei-04-295824 (pgs. 2-3, FIG. 1) and Japanese Kokai Publication Hei-09-5780 (pgs. 2, 5, FIG. 1)).

Figure 7A:
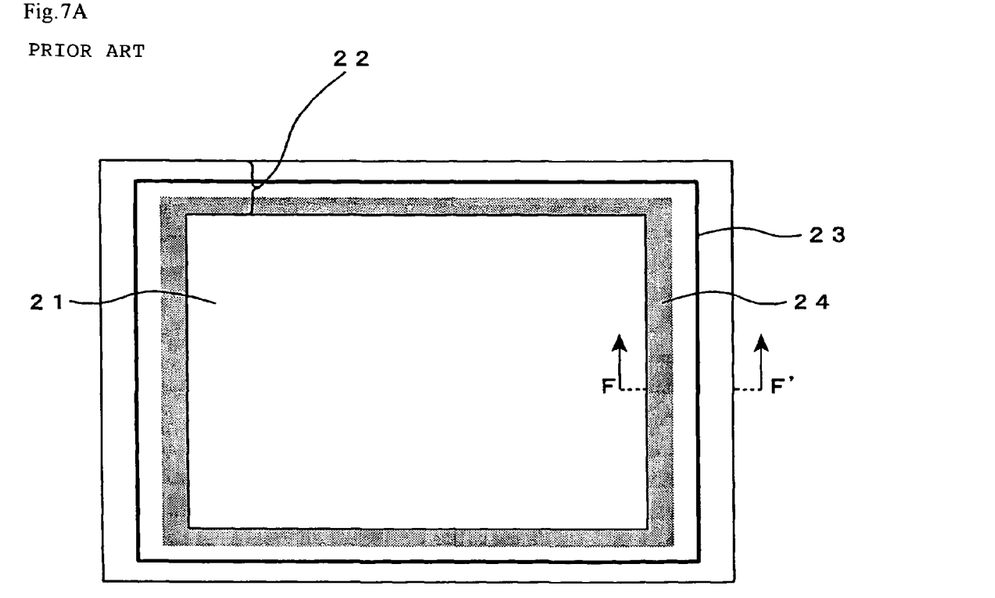
FIG. 7A is a plan view of a panel constituting a conventional liquid crystal display device.
Figure 7B:
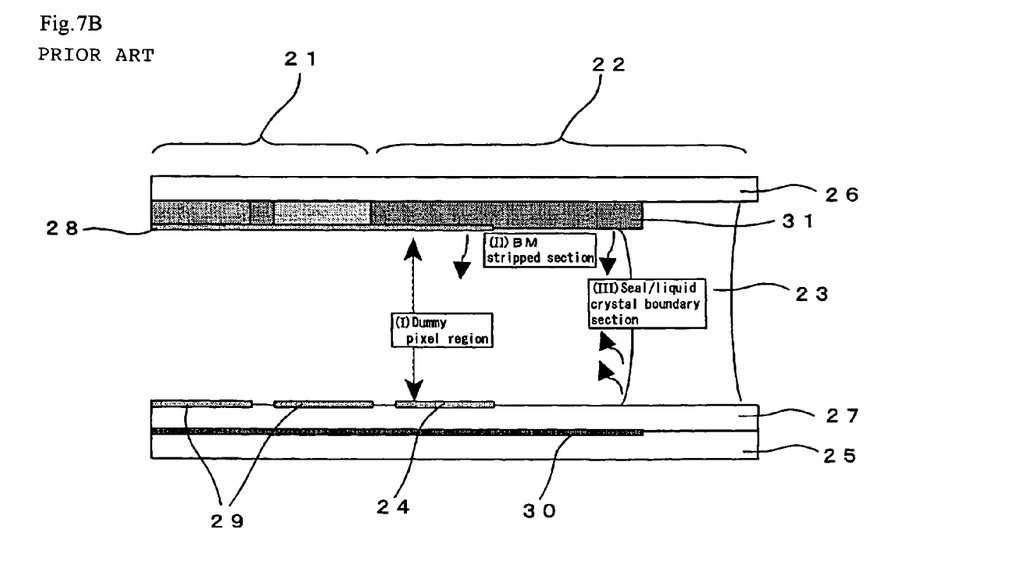
FIG. 7B is a cross sectional view of the panel cut along the cross sectional line F-F' of FIG. 7A.

A mechanism of occurrence of unevenness of display and spots caused by impurity ions and conventional liquid crystal display devices will be described. FIG. 7A is a plan view of a panel of a conventional liquid crystal display device. And, FIG. 7B is a cross sectional view of a part of a display region 21 and a non-display region 22 of the panel cut along the cross sectional line F-F' of FIG. 7A. As illustrated in FIG. 7A, in conventional devices, the dummy pixel 24 driven in the same way as a dummy electrode or a pixel is arranged in the non-display region 22 between the display region 21 and the seal 23.

In such liquid crystal display devices, the non-display region on the inner side of a seal consists of (I) dummy pixels or dummy electrode sections paired by a combination of a first substrate and a second substrate, (II) a BM (black mask) stripped section of the second substrate and an insulating layer section of the first substrate placing opposite the BM stripped section, and (III) a seal/liquid crystal boundary section. Impurity ions used in the BM material, and impurity ions attached to the BM surface that were not washed off are eluted from (II). The display region has an orientation film printed on the BM, resulting in a slight influence by elution of impurity ions.

Also, impurity ions that have not reacted during hardening of the seal are eluted from (III).

These impurity ions enter a display region to cause a reduction in voltage retention, resulting in the occurrence of unevenness of luminance, spots, etc.

In order to prevent the above-described problems from occurring, conventionally, impurity ions are retained within the region of (I) by driving a dummy electrode or a dummy pixel and applying a voltage thereto, thereby the influence on a display region is prevented.

However, in the above-described conventional art, the following two points need to be further improved.

(1) Elution of impurity ions within a non-display region is accelerated.

(2) Impurity ions retained within a dummy electrode or a dummy pixel enter a display region when power is turned off, which results in causing unevenness of luminance and spots.

Regarding (1), an electric field is generated in a non-display region under the influence of driving a metal wiring, a dummy electrode or a dummy pixel of a first substrate, and the electric field draws out impurity ions attached to a BM of the non-display region and impurity ions used in the BM or a seal itself, resulting in acceleration of elution of impurity ions.

Next, regarding (2), conventionally, eluted impurity ions are retained within a non-display region by application of a voltage to a dummy electrode or a dummy pixel, but when power is turned off, the retained impurity ions are eluted to a display region.

As is mentioned above, a sufficient reliability may not be obtained when liquid crystal display devices are used for TVs, etc. that are used over a long period of time and turned on and off many times, by a method of trapping impurity ions with a dummy electrode or a dummy pixel as in conventional liquid crystal display devices, and thus, a sufficient elimination of unevenness of display, spots, etc. caused by reduction of voltage retention by impurity ions, and further improvement in reliability of long time/long term use in active matrix liquid crystal display devices, etc. are desired.

SUMMARY OF THE INVENTION

In order to solve the problems described above, preferred embodiments of the present invention provide a liquid crystal display device in which unevenness of display, spots, etc. caused by lowering of voltage retention by impurity ions are sufficiently eliminated and reliability of long term use is improved.

The inventors made various reviews of a configuration of a liquid crystal display device in which unevenness of display, spots, etc. may be prevented, and learned that much of the unevenness of display and spots is caused by lowering of voltage retention result from elution of impurity ions from a non-display region surrounding a display region to the display region and that such defects are due to elution of impurity ions attached to a BM surface of the non-display region and elution of the impurity ions used in a BM material or a seal itself, by drive of pixels of the display region adjacent the non-display region and generation of an electric field from a metal wiring of the non-display region. The inventors discovered that prevention of elution of impurity ions itself is effective in obtaining sufficient reliability of long term use, that is, instead of retaining eluted impurity ions within a non-display region and reducing influence on a display region to improve reliability as in conventional devices, prevention of elution of impurity ions to a liquid crystal layer is effective in improvement of reliability, and is particularly effective in application to devices such as a TV, etc. that are used over a long period of time and turned on and off many times, and thus the above problems are effectively solved and the present invention is achieved.

A preferred embodiment of the present invention provides a liquid crystal display device having a liquid crystal layer disposed between a first substrate and a second substrate configured via a seal, wherein the liquid crystal display device includes electrodes on the liquid crystal layer side of a non-display region of the first substrate and/or the second substrate, and the potentials of the electrodes are substantially the same.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

A liquid crystal display device according to a preferred embodiment of the present invention has a seal, and a liquid crystal layer is formed between a first substrate and a second substrate, and normally the liquid crystal layer is formed by application of a seal in between a first substrate and a second substrate, lamination of the first substrate and the second substrate and filling of a liquid crystal in between the first substrate and the second substrate. For instance, in TN mode (Twisted Nematic mode) or VA mode (Vertical Alignment mode), a plurality of metal wirings and pixel electrodes are formed and arranged in a matrix form on a first substrate, and a common electrode consisting of a transparent electrode is arranged on a second substrate. In IPS mode (In-Plane Switching mode), metal wirings and electrodes are arranged on a first substrate, and electrodes, etc. are not arranged on a second substrate. The first substrate and the second substrate include a display region and a non-display region surrounding it, and include a seal in the non-display region.

In preferred embodiments of the present invention, electrodes are arranged on the liquid crystal layer side of a non-display region of the first substrate and/or the second substrate, and the potentials of the electrodes are substantially the same. For example, in TN mode or VA mode, frame electrodes are deposed on the liquid crystal layer side of a non-display region of each of a first substrate and a second substrate, and the potentials of the paired frame electrodes of the first substrate and the second substrate are substantially the same. The frame electrode is an electrode formed in a non-display region of a substrate, and for example, in a substrate on which pixel electrodes are formed, the frame electrodes are formed in the non-display region using the same material as or different material from the pixel electrodes. And, in a substrate on which a common electrode is formed, a frame electrode is formed in the non-display region by extension of the common electrode to a non-display region, or by use of the same material as or different material from the common electrode.

Moreover, in IPS mode, a signal electrode and a common electrode are provided on a liquid crystal layer side of a non-display region of a first substrate, and the potentials of the signal electrode and the common electrode are substantially the same.

In preferred embodiments of the present invention, the potentials of the electrodes on the liquid crystal layer side of the non-display region of the first substrate and/or the second substrate need only to be substantially the same, that is, the potentials of the electrodes are substantially the same in the above preferred embodiments, impurity ions are prevented from eluting out of a BM material and a seal, etc. of the non-display region, and operations and effects of preferred embodiments of the present invention are exhibited. Further, in preferred embodiments of the present invention, the potentials of the electrodes on the liquid crystal layer side of the non-display region of the first substrate and/or the second substrate are substantially the same during panel drive, and the potentials of the electrodes are substantially the same when the potentials of the electrodes are positive or negative other than during the panel drive, and effects of preferred embodiments of the present invention are sufficiently exhibited particularly when the potentials of the electrodes are substantially the same during the panel drive.

Figure 1A:
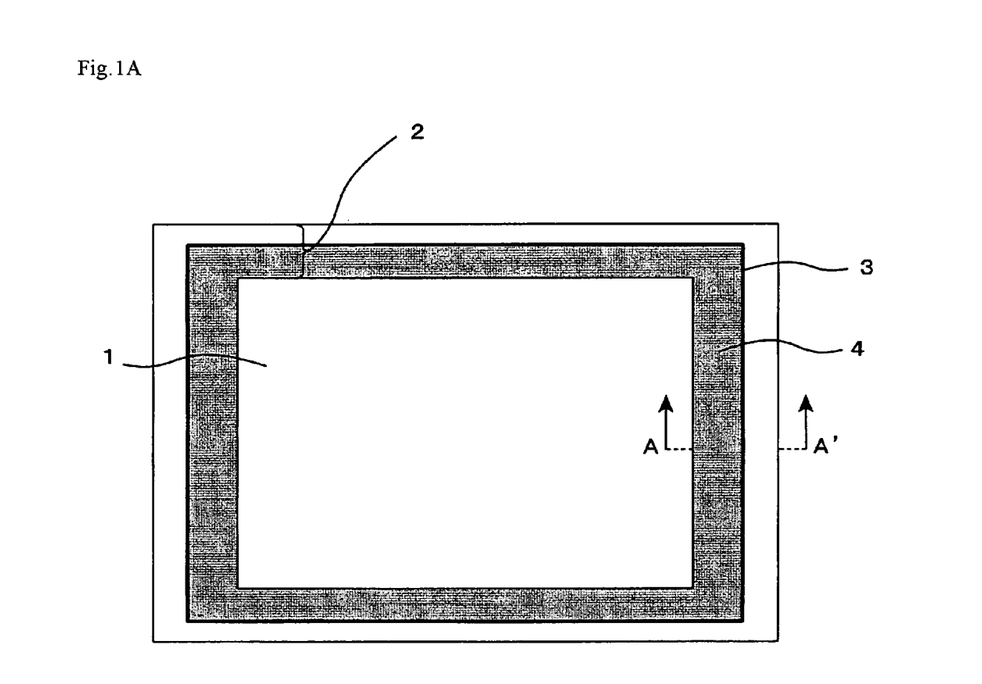
FIG. 1A is a plan view of a panel constituting a liquid crystal display device according to a preferred embodiment of the present invention.
Figure 1B:
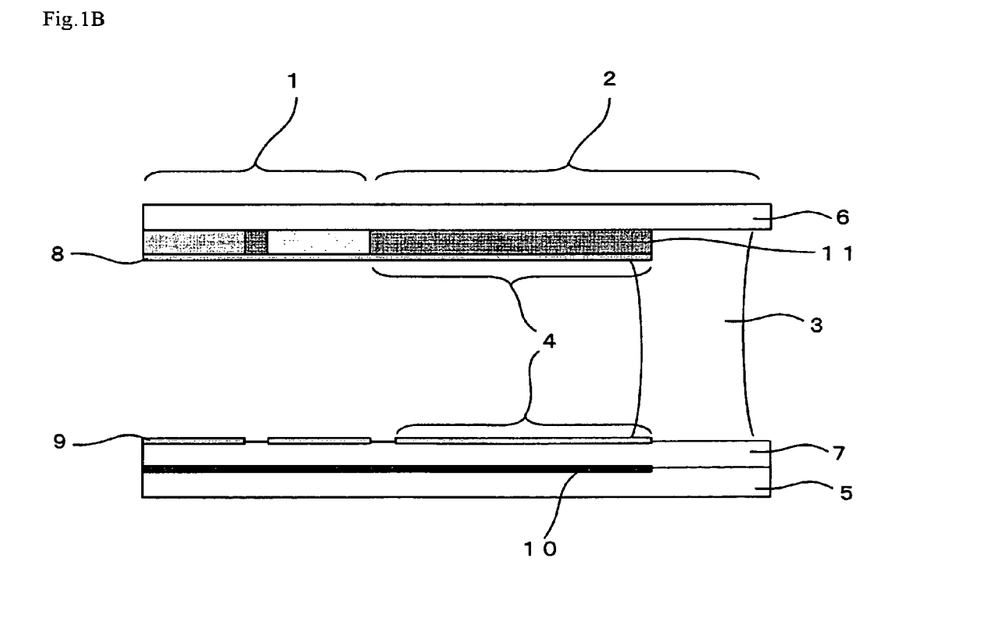
FIG. 1B is a cross sectional view of the panel cut along the cross sectional line A-A' of FIG. 1A.

A preferred embodiment of such a liquid crystal display device is illustrated in FIGS. 1A and 1B. FIG. 1A is a plan view schematically illustrating a panel constituting a liquid crystal display device of a preferred embodiment of the present invention. FIG. 1B is a cross sectional view schematically illustrating one part of a display region 1 and a non-display region 2 of the panel cut along the cross sectional line A-A' of FIG. 1A.

In a preferred embodiment of the present invention, as illustrated in FIGS. 1A and 1B, the frame electrodes 4 (dummy electrodes, electrodes of the non-display region) are arranged in the non-display regions 2 of the first substrate and the second substrate, and the frame electrode of the first substrate and that of the second substrate have the same potential. In this case, the frame electrodes 4 in the non-display region 2 are extended to the sealed region 3 to sufficiently prevent impurity ions from eluting out to a liquid crystal layer.

One reason why operations and effects of a preferred embodiment of the present invention are achieved in FIGS. 1A and 1B is, for example, that elution of impurity ions from a surface of the BM 11 of the non-display region 2 and the BM 11 itself is prevented when electrodes of the non-display region have the same potential and an electric field generated in the non-display region 2 of FIG. 1B hardly exists. Moreover, the electrodes of the non-display region are extended to a boundary region (seal/liquid crystal boundary region) of the seal part 3 and the liquid crystal layer of FIG. 1B, resulting in cut of the electric field which is generated out of the metal wiring 10 (metal signal wiring) on the first substrate and applies a voltage to the seal part 3, and prevention of elution of impurities from the seal material.

Other specific preferred embodiments of the present invention will hereinafter be described.

In the liquid crystal display device of a preferred embodiment of the present invention, at least one of the first substrate and the second substrate preferably includes a metal wiring, and the electrodes of the non-display region are arranged in a region other than that overlapping the metal wiring. And at least one of the first substrate and the second substrate preferably includes a metal wiring and an interlayer insulation film towards the liquid crystal layer side in this order, that is, includes an interlayer insulation film on metal wiring section.

The electrodes of the non-display region preferably exist over a whole non-display region in terms of prevention of elution of impurity ions from the non-display region, but for example, the electrodes of the non-display region are arranged in a region overlapping the metal wirings via an interlayer insulation film, signal delay of the source or the gate may occur by the capacitor generated via the insulator. In this case, the electrodes of the non-display region are formed into an arrangement excluding the non-display region on the metal wiring, that is, into an arrangement excluding part of the non-display region overlapping the metal wiring. The metal wiring includes a signal line (metal signal wiring, source line), a scanning line (gate line), etc. and the electrodes of the non-display region are preferably formed into an arrangement excluding part of the non-display region overlapping the signal line.

The electrodes of the non-display region are arranged up to a sealed region. Such form permits the sufficient prevention of the above-mentioned elution of impurity ions to a liquid crystal layer. Preferably, (1) a form where the electrodes of the non-display region are electrically conducted by a common transition on the inner side of the seal, (2) a form where the electrodes of the non-display region are electrically conducted by a common transition on the outer side of the seal, and (3) a form where the electrodes of the non-display region are electrically conducted via a conductive material inside the seal.

In these cases, for example, the electrode of the non-display region of the first substrate and the electrode of the non-display region of the second substrate are connected via a electrically conductive substance (electrically conductive material) so as to be electrically conducted, and have the substantially same potential, and thus the elution of impurities from a seal material may be more sufficiently prevented as mentioned above.

Figure 2:
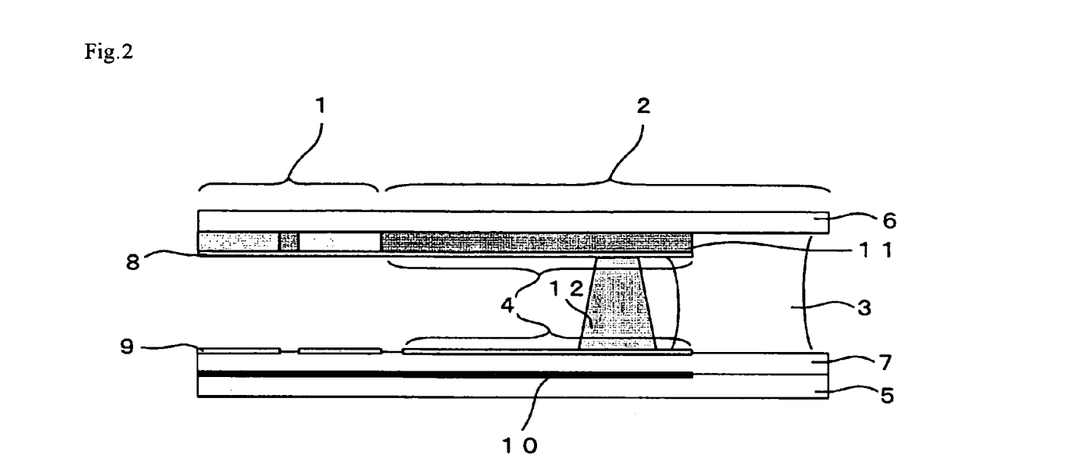
FIG. 2 is a cross sectional view of a panel according to a preferred embodiment of the present invention (preferred embodiment 1 or 2).

In the above-described form (1), for example, the electrode of the non-display region of the second substrate is electrically conducted with the electrode of the non-display region of the first substrate by a common transition on the inner side of the seal and thus has the same potential as the electrode of the non-display region of the first substrate. In this case, for example, as illustrated in FIG. 2, the frame electrodes 4 of both substrates are connected in a liquid crystal layer by application of the electrically conductive substance such as the electrically conductive paste 12, and thus have the same potential. In such form, the electrodes of the non-display region are preferably arranged up to the sealed region.

Figure 3:
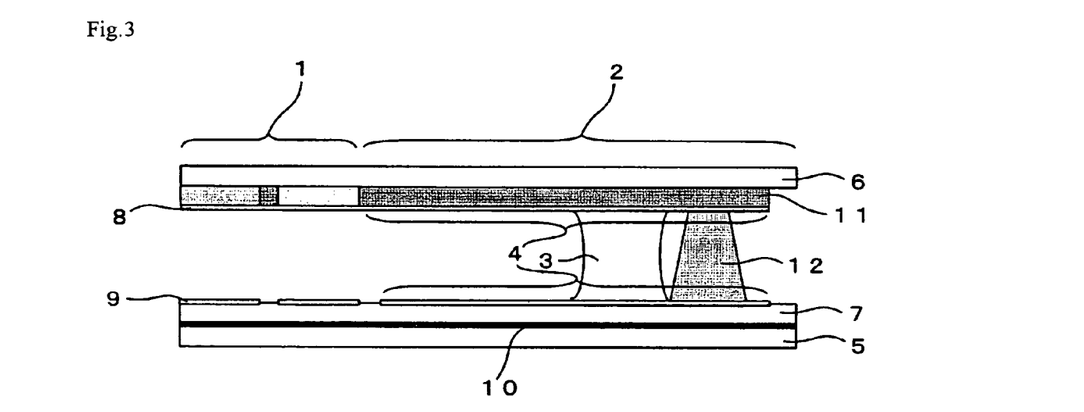
FIG. 3 is a cross sectional view of a panel according to another preferred embodiment of the present invention (preferred embodiment 3).

In the above-described form (2), for example, the electrode of the non-display region of the second substrate is electrically conducted with the electrode of the non-display region of the first substrate by a common transition on the outer side of the seal and has the same potential as the electrode of the non-display region of the first substrate. In this case, for example, as illustrated in FIG. 3, the frame electrodes 4 are formed by extension of part of or all of the electrodes of the non-display region to the outer side of the seal 3, and the frame electrodes 4 of both substrates are connected on the side facing the liquid crystal layer via the seal 3 by application of the electrically conductive substance such as the electrically conductive paste 12, and thus have the same potential.

Figure 4:
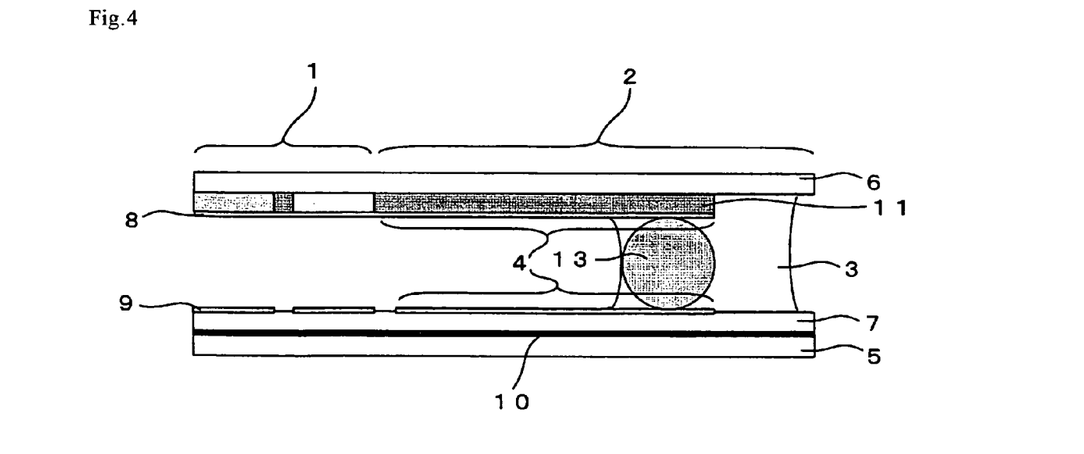
FIG. 4 is a cross sectional view of a panel according to another preferred embodiment of the present invention (preferred embodiment 4).

In the above-described form (3), for example, the electrode of the non-display region of the second substrate is electrically conducted with the electrode of the non-display region of the first substrate via the electrically conductive material in the seal and thus has the same potential as the electrode of the non-display region of the first substrate. In this case, for example, as illustrated in FIG. 4, the frame electrodes 4 are formed by extension of part of or all of the electrodes of the non-display region to the inside the seal 3, and the electrically conductive substance such as the electrically conductive bead 13 is arranged inside the seal 3 so as to contact the frame electrodes 4 of both substrates, and thus the frame electrodes 4 have the same potential. Such an electrically conductive bead 13 is, for example, mixed with resin for the seal 3 and will be arranged inside the seal 3.

Since the liquid crystal display device of preferred embodiments of the present invention has the above-mentioned configuration, elution of impurity ions from a non-display region may be prevented, so unevenness of display, spots, etc. caused by lowering of voltage retention by impurity ions are sufficiently eliminated and the reliability of long time/long term use is improved, leading to maintenance of a display quality better than that in conventional panels.

The present invention will, hereinafter be described in more detail, but the present invention is not limited only to the following specific preferred embodiments.

Preferred Embodiment 1

Figure 5A:
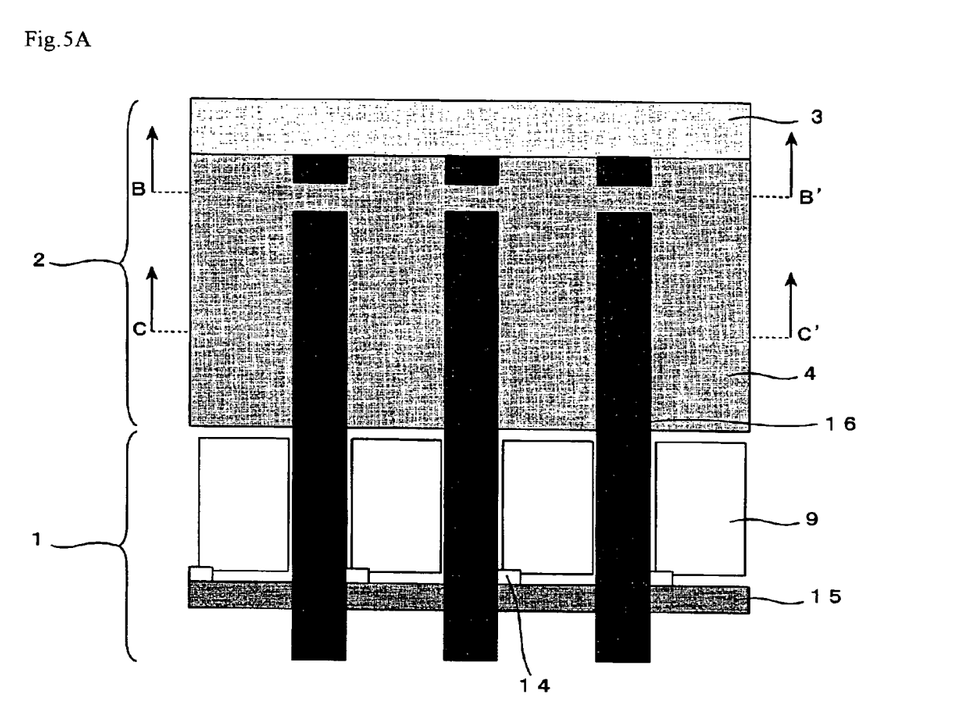
FIG. 5A is a plan view of the first substrate of the panel according to preferred embodiment 1 of the present invention.
Figure 5B:
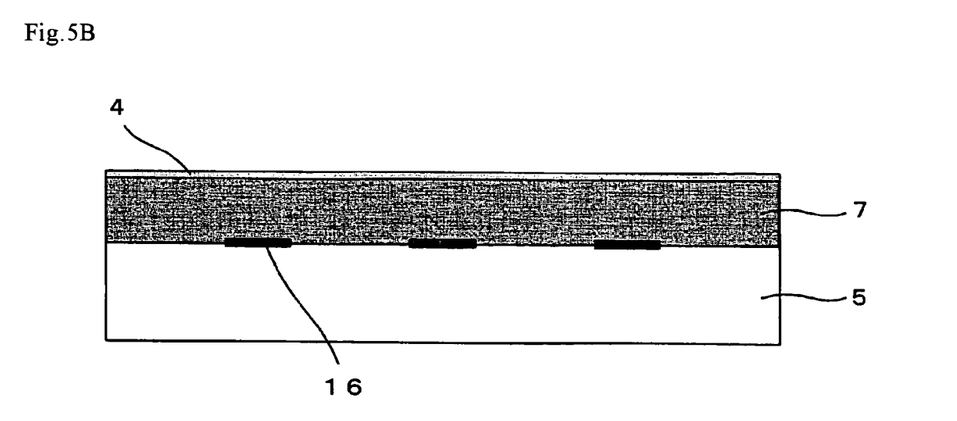
FIG. 5B is a cross sectional view of the first substrate cut along the cross sectional line B-B' of FIG. 5A.
Figure 5C:
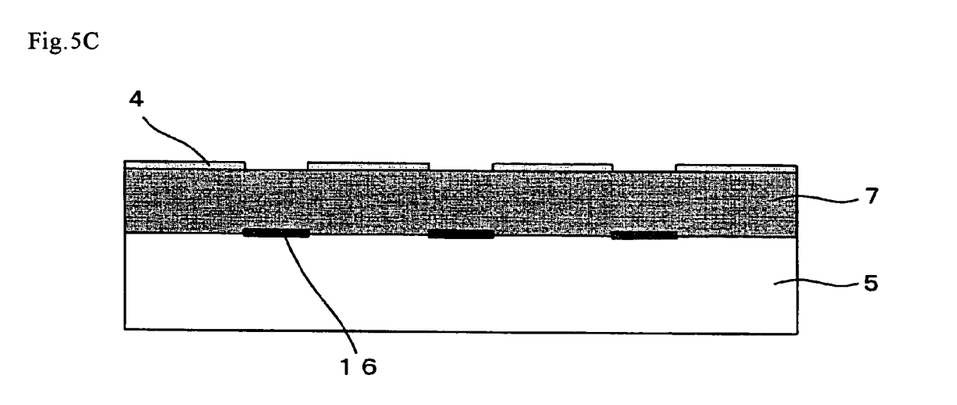
FIG. 5C is a cross sectional view of the first substrate cut along the cross sectional line C-C' of FIG. 5A.

Preferred Embodiment 1 of the invention will be described. FIG. 5A is a plan view schematically illustrating one part of the display region 1 and the non-display region 2 of the first substrate of the panel in preferred embodiment 1 of the present invention. FIG. 5B is a cross sectional view of the first substrate cut along the cross sectional line B-B' of FIG. 5A, and FIG. 5C is a cross sectional view of the first substrate cut along the cross sectional line C-C' of FIG. 5A.

First, in the first substrate, an Al film is grown on the glass substrate 5 with a sputtering device, and the gate lines 15 (gate lines, scanning lines), gate electrodes, and auxiliary capacitance lines are simultaneously formed in a photolithography step and an etching step such as dry etching. In the present preferred embodiment, glass is used as a transparent insulating substrate, but any kind of materials having transparent insulation such as plastic may also be used.

Next, a gate insulator (interlayer insulation film) comprising silicon nitride (SiNx) is grown on the above by plasma CVD (Plasma Chemical Vapor Deposition). Thereafter, the active elements 14 such as thin-film transistors (TFTs) will be formed. Firstly, the active semiconductor layers are grown by plasma CVD. The amorphous silicon (e.g., n-type amorphous silicon) layers are then grown by plasma CVD.

Further, an Al film is grown with the sputtering device, and the source lines 16 (signal line), the source electrodes, and the drain electrodes are formed in a photolithography step and an etching step such as dry etching.

In this preferred embodiment, Al is used for the gate lines, the gate electrodes, the auxiliary capacitance lines, the source lines, the source electrodes and the drain electrodes, but any kind of materials by which a desired bus line resistance is obtained, for example, metals such as Ti, Cr or alloys thereof may be used. Stacked films of TiN/Al/Ti, Mo/Al/Mo, etc. may be also used.

Then, an insulating film including a transparent resin, etc. is formed by a spin coating method, etc., and in the insulating layer 7 (interlayer insulation film), contact holes for contacting the pixel electrodes formed thereon and the drains or through-holes for forming the auxiliary capacitances are formed. Transparent electrodes including ITO (indium tin oxide), etc. are grown on the insulating layer 7 by sputtering, and the pixel electrodes 9 are formed in a photolithography step and an etching step. And at that time, the frame electrode 4 is simultaneously formed in the non-display region 2. In this case, the frame electrode 4 is preferably formed up to the sealed region 3. The electrode of the non-display region (frame electrode 4, dummy electrode) desirably exists over the whole non-display region 2, but when a capacitance is generated via the insulator between frame electrode and the metal wirings, signal delay of the source or the gate is caused, so the electrode of the non-display region is formed into an arrangement excluding part of the metal wirings (source lines 16), as illustrated in FIG. 5C.

In the second substrate, pixels of RGB (Red, Green, Blue) corresponding to the pixels of the first substrate and the BMs of light-shielding parts are formed by a dry film method, a spin coating method, an ink jet method, etc. Thereafter, a transparent electrode including ITO, etc. is formed as the opposing electrode (common electrode). In this case the opposing electrode is formed not only in part of the display region but extended to the non-display region 2, and the seal part 3 to form the frame electrode.

Orientation films including polyimide are then printed on or applied to both the first substrate and the second substrate so that the liquid crystal molecules can be oriented. In some cases, in order to maintain cell thickness of a panel, spacers such as plastic beads are sprayed after the orientation process such as rubbing is performed, or columnar spacers are formed on the first substrate or the second substrate in advance.

And then, a panel is prepared by drawing of a thermosetting sealing material such as epoxy resin with a dispenser, lamination of both substrates and injection of a liquid crystal after hardening of the seal, or lamination of both substrates after drop of a liquid crystal and hardening of the seal. As a seal material, a UV (ultraviolet) hardening material may be used and hardened by a UV irradiation. The first substrate and the second substrate are conducted by application of the electrically conductive paste 12 such as carbon resistor paste or the resin including electrically conductive beads to the frame electrodes 4 on the inner side of the seal 3 of the non-display regions 2 of the first substrate and the second substrate before lamination of the both substrates as illustrated in FIG. 2, and have the same potential In panels of the conventional liquid crystal display devices, unevenness of luminance around the panel may be caused after the 1000-hour burn-in test at 70° C., but in a panel of TN mode in the present preferred embodiment, a satisfactory display quality may be maintained even after the 1000-hour burn-in test.

This technique may be used not only for TN mode but also for VA mode. And further, in IPS mode, as a substrate opposing an array substrate includes no electrode, signal electrode and common electrode of a non-display region have the same potential and are grounded to obtain effects similar to that as in TN mode.

Preferred Embodiment 2

Figure 6A:
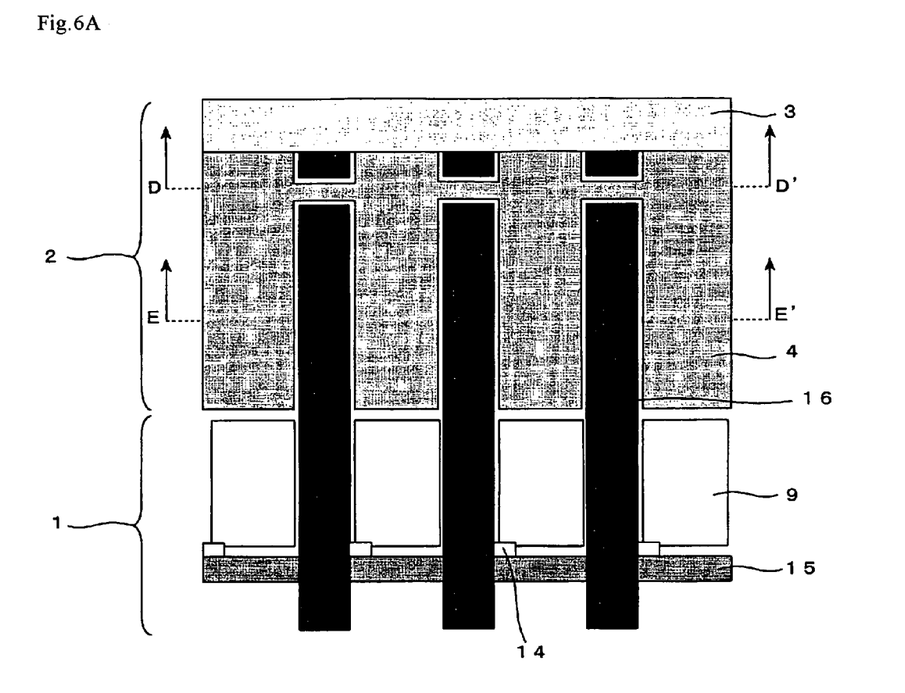
FIG. 6A is a plan view of the first substrate of the panel according to preferred embodiment 2 of the present invention.
Figure 6B:
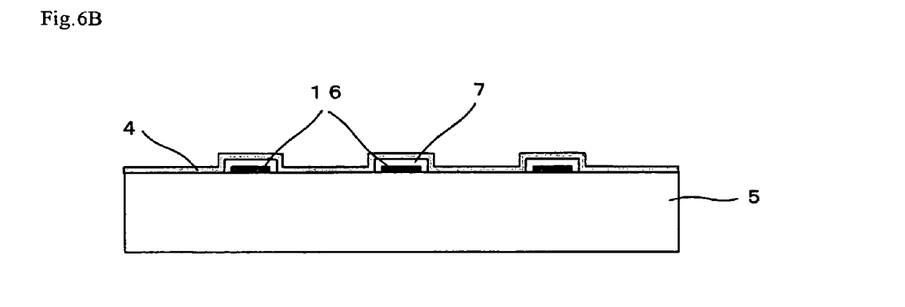
FIG. 6B is a cross sectional view of the first substrate cut along the cross sectional line D-D' of FIG. 6A.
Figure 6C:
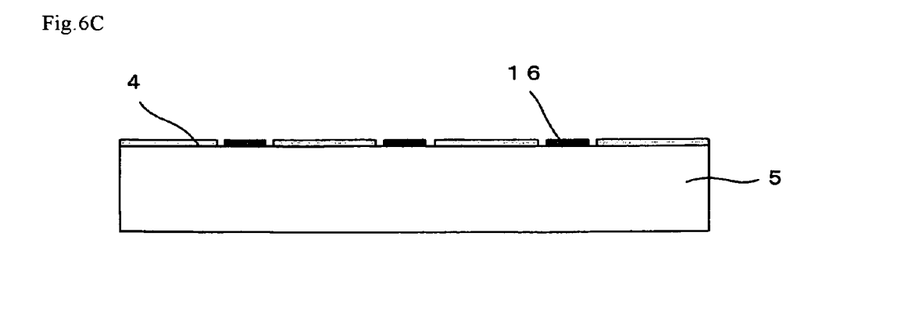
FIG. 6C is a cross sectional view of the first substrate cut along the cross sectional line E-E' of FIG. 6A.

Preferred Embodiment 2 of the present invention will be described. FIG. 6A is a plan view schematically illustrating part of the display region 1 and the non-display region 2 of the first substrate of the panel in preferred embodiment 2 of the present invention. FIG. 6B is a cross sectional view of the first substrate cut along the cross sectional line D-D' of FIG. 6A, and FIG. 6C is a cross sectional view of the first substrate cut along the cross sectional line E-E' of FIG. 6A.

First, in first substrate, an Al film is grown on a glass substrate 5 with a sputtering device, and the gate lines 15 (gate lines, scanning lines), gate electrodes, and auxiliary capacitance lines are simultaneously formed in a photolithography step and an etching step such as dry etching. In the present preferred embodiment, glass is used as a transparent insulating substrate, but any kind of materials having transparent insulation such as plastic may also be used.

Next, a gate insulator (interlayer insulation film) including silicon nitride (SiNx), etc. is grown on the above by plasma CVD. Thereafter, active elements 14 such as thin-film transistors (TFTs) will be formed. Firstly, the active semiconductor layers are grown by plasma CVD. The amorphous silicon (e.g., n-type amorphous silicon) layers are then grown by plasma CVD.

Moreover, transparent electrodes including ITO, and Mo film are grown with a sputtering device, and the source lines 16 (signal lines), source electrodes, and the drain electrodes are formed in a photolithography step and an etching step such as dry etching, and the pixel electrodes 9 are formed in the photolithography step and a etching step such as wet etching.

In this preferred embodiment, Al is used for the gate lines, the gate electrodes, the auxiliary capacitance lines, the source lines, the source electrodes and the drain electrodes, but any kind of materials by which a desired bus line resistance is obtained, for example, metals such as Ti, Cr or alloys thereof may be used. Stacked films of TiN/Al/Ti, Mo/Al/Mo, etc. may be also used.

A insulating film including silicon nitride (SiNx), etc. is grown on the above by plasma CVD, and patterned in a photolithography step and etching step. At that time, metal wirings (source lines 16) of the non-display region 2 are covered with insulating films (insulating film layers 7, interlayer insulation films).

A Ti film is grown on the non-display region 2 by sputtering, and frame electrodes 4 are formed only in the non-display region 2 in a photolithography step and a dry etching step. In this case, the frame electrode 4 is preferably formed up to a sealed region 3. Ti is used for the frame electrodes 4 (electrodes of the non-display region, dummy electrodes), but metals such as Al, Cr and alloys thereof, stacked films such as TiN/Al/Ti, Mo/Al/Mo, ITO or IZO (indium zinc oxide) may also be used. When capacitance is generated via insulators between the electrode of the non-display region and the metal wirings, signal delay of the source or the gate is caused, so the electrode of the non-display region is formed into a shape excluding part of the metal wirings (source lines 16), as illustrated in FIG. 6C. In the second substrate, pixels of RGB (Red, Green, Blue) corresponding to the pixels of the first substrate and the BMs of light-shielding parts are formed by a dry film method, a spin coating method, an ink jet method, etc. Thereafter, a transparent electrode including ITO, etc. is formed as the opposing electrode (common electrode). In this case the opposing electrode is formed not only in part of the display region but extended to the non-display region 2, and the seal part 3 to form the frame electrode.

Orientation films including polyimide are then printed on or applied to both the first substrate and the second substrate so that the liquid crystal molecules can be oriented. In some cases, in order to maintain cell thickness of a panel, spacers such as plastic beads are sprayed after the orientation process such as rubbing is performed, or columnar spacers are formed on the first substrate or the second substrate in advance.

And then, a panel is prepared by drawing of a thermosetting sealing material such as epoxy resin with a dispenser, lamination of both substrates and injection of a liquid crystal after hardening of the seal, or lamination of both substrates after drop of a liquid crystal and hardening of the seal. As a seal material, a UV (ultraviolet) hardening material may be used and hardened by a UV irradiation. The first substrate and the second substrate are conducted by application of the electrically conductive paste 12 such as carbon resistor paste or the resin including electrically conductive beads to the frame electrodes 4 on the inner side of the seal 3 of the non-display regions 2 of the first substrate and the second substrate before lamination of the both substrates as illustrated in FIG. 2, and have the same potential In panels of the conventional liquid crystal display devices, unevenness of luminance around the panel may be caused after the 1000-hour burn-in test at 70° C., but in a panel of TN mode in the present preferred embodiment, a satisfactory display quality may be maintained even after the 1000-hour burn-in test.

This technique may be used not only for TN mode but also for VA mode. And further, in IPS mode, as a substrate opposing an array substrate does include no electrode, a signal electrode and a common electrode of a non-display region have the same potential and are grounded to obtain effects similar to that as in TN mode.

Preferred Embodiment 3

A panel is prepared with the method mentioned in preferred embodiment 1 and preferred embodiment 2 except that a first substrate and a second substrate are prepared by extension of part of the frame electrodes 4 to the outer side of the seal 3. In this case, as illustrated in FIG. 3, the electrically conductive paste 12 such as silver paste or carbon resistor paste is applied to electrodes outside of the seal 3, and the frame electrodes 4 of the first substrate and second substrate are electrically conducted and have the same potential. When the panel is prepared in this way, effects similar to that as in preferred embodiment 1 and preferred embodiment 2 are obtained.

Preferred Embodiment 4

A panel is prepared with the method mentioned in preferred embodiment 1 and preferred embodiment 2 except that a first substrate and a second substrate are prepared by extension of part of the frame electrodes 4 to the inner side of the seal 3. In this case, as illustrated in FIG. 4, the frame electrodes 4 of the first substrate and the second substrate are electrically conducted with the electrically conductive beads 13 such as gold plated plastic beads inside the seal 3 and have the same potential. When the panel is prepared in this way, effects similar to that as in preferred embodiment 1 and preferred embodiment 2 are obtained.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A liquid crystal display device comprising:
a first substrate;
a second substrate;
a liquid crystal layer and a seal arranged between the first substrate and the second substrate;
a display region; and
a non-display region surrounding the display region, the non-display region including a liquid crystal layer region having the liquid crystal layer arranged therein and a sealed region having the seal arranged therein; wherein
the first substrate includes a thin-film transistor, an insulating resin film, and a pixel electrode, arranged in this order, extending toward the liquid crystal layer, and further includes a first dummy electrode in the liquid crystal layer region of the non-display region;
the pixel electrode is connected to a drain electrode of the thin-film transistor through a contact hole formed in the insulating resin film;
the second substrate includes a transparent common electrode above a color filter and a black mask, and includes a second dummy electrode in the liquid crystal layer region of the non-display region;
the first dummy electrode is arranged to be separated from the pixel electrode of a display region, and the first dummy electrode and the pixel electrode are formed of the same material;
the second dummy electrode extends from the common electrode of the display region; and
the first and second dummy electrodes each encircle the display region and have substantially the same potential.

2. The liquid crystal display device according to claim 1, wherein the first substrate includes a metal wiring in the non-display region, and the first dummy electrode is arranged in a region other than that overlapping the metal wiring.

3. The liquid crystal display device according to claim 1, wherein at least one of the first dummy electrode and the second dummy electrode is arranged to extend up to the sealed region.

4. The liquid crystal display device according to claim 1, wherein the first and second dummy electrodes are electrically conducted by a common transition on the inner side of the seal.

5. The liquid crystal display device according to claim 1, wherein the first and second dummy electrodes are electrically conducted by a common transition on the outer side of the seal.

6. The liquid crystal display device according to claim 1, wherein the first and second dummy electrodes are electrically conducted via a conductive material inside the seal.

7. The liquid crystal display device according to claim 1, wherein the first and second dummy electrodes each completely and continuously encircle the display region.

8. The liquid crystal display device according to claim 1, wherein the first and second dummy electrodes are in direct contact with the liquid crystal layer.

* * * * *